(12) United States Patent
Barton

(10) Patent No.: US 10,527,175 B2
(45) Date of Patent: Jan. 7, 2020

(54) VALVE SEAT

(71) Applicant: Chargepoint Technology Limited, Liverpool, Merseyside (GB)

(72) Inventor: Richard Athol Barton, Manchester (GB)

(73) Assignee: ChargePoint Technology Limited, Liverpool (GB)

( * ) Notice: Subject to any disclaimer, the term of this patent is extended or adjusted under 35 U.S.C. 154(b) by 0 days.

(21) Appl. No.: 15/036,157

(22) PCT Filed: Nov. 14, 2014

(86) PCT No.: PCT/GB2014/053387
§ 371 (c)(1),
(2) Date: May 12, 2016

(87) PCT Pub. No.: WO2015/071685
PCT Pub. Date: May 21, 2015

(65) Prior Publication Data
US 2016/0298772 A1    Oct. 13, 2016

(30) Foreign Application Priority Data

Nov. 15, 2013 (GB) .................................. 1320214.8

(51) Int. Cl.
*F16K 1/226* (2006.01)
*F16K 1/22* (2006.01)
(52) U.S. Cl.
CPC ............ *F16K 1/2263* (2013.01); *F16K 1/223* (2013.01)

(58) Field of Classification Search
CPC .... F16K 1/2057; F16K 1/2064; F16K 1/2078; F16K 1/22; F16K 1/226; F16K 1/2267;
(Continued)

(56) References Cited

U.S. PATENT DOCUMENTS 3,173,648 A * 3/1965 McGuire ............... F16K 5/0673
251/188
3,210,042 A * 10/1965 Freeman ............... F16K 5/0678
251/175
(Continued)

FOREIGN PATENT DOCUMENTS

DE   19534915 C1   11/1996
DE   19542568 A1   5/1997
(Continued)

OTHER PUBLICATIONS

International Search Report received in PCT/GB2014/053387, dated Feb. 13, 2015.
(Continued)

*Primary Examiner* — Reinaldo Sanchez-Medina
*Assistant Examiner* — Hailey K. Do
(74) *Attorney, Agent, or Firm* — Suzannah K. Sundby, Esq.; Canady + Lortz LLP

(57) ABSTRACT

A valve seat (10) comprises a substantially annular rigid scaffold member (12) and a substantially annular elastomeric sealing member (14) sealingly mounted on top of the rigid scaffold member. The valve seat has an outer peripheral surface for cooperation with the valve body of a valve assembly, and the elastomeric sealing member defines an inner sealing surface of the valve seat for cooperation with a valve closure disc of a valve assembly.

25 Claims, 6 Drawing Sheets

(58) Field of Classification Search
CPC ...... F16K 1/2265; F16K 1/2263; F16K 1/465;
F16K 41/04; F16K 41/06; F16K 41/043;
F16K 41/063; F16K 41/046; F16K
41/066; F16K 5/0673; F16K 5/0678;
F16K 5/0689; F16K 5/0694; F16K
1/2268; F16K 1/425; F16K 1/46; F16K
1/223; F16K 5/0271; F16K 5/0471
USPC ................ 251/306, 149, 149.2, 149.8, 149.9
See application file for complete search history.

(56) References Cited

U.S. PATENT DOCUMENTS

| | | | | |
|---|---|---|---|---|
| 3,534,939 | A * | 10/1970 | Frazier | F16K 1/2265 251/306 |
| 3,596,876 | A * | 8/1971 | Scaramucci | F16K 1/2263 251/151 |
| 3,666,233 | A * | 5/1972 | Scaramucci | F16K 1/2265 251/151 |
| 3,782,236 | A * | 1/1974 | Shalek | G10D 7/10 84/397 |
| 4,230,139 | A * | 10/1980 | Scaramucci | F16K 1/2263 137/74 |
| 4,254,793 | A * | 3/1981 | Scaramucci | F16K 5/0673 137/246.22 |
| 4,457,491 | A * | 7/1984 | Dudman | F16K 5/0673 251/317 |
| 4,650,157 | A * | 3/1987 | Sillaman | F16K 5/0673 251/144 |
| 4,998,708 | A * | 3/1991 | Pavanel | F16K 1/2263 251/306 |
| 6,785,914 | B2 * | 9/2004 | Kimura | E03D 1/306 4/378 |
| 2008/0023664 | A1 * | 1/2008 | Sakagami | F16K 1/2265 251/360 |
| 2011/0088353 | A1 | 4/2011 | Lais et al. | |
| 2011/0127459 | A1 * | 6/2011 | Takahashi | F16K 99/0015 251/333 |
| 2013/0187069 | A1 * | 7/2013 | Ranpuria | F16K 1/222 251/212 |

FOREIGN PATENT DOCUMENTS

| | | | | |
|---|---|---|---|---|
| EP | 1245894 A1 | 10/2002 | | |
| FR | 2305663 A1 * | 10/1976 | ........... | F16K 1/2263 |
| GB | 1102143 A * | 2/1968 | ........... | F16K 5/0673 |
| GB | 2226619 A * | 7/1990 | ........... | F16K 1/2263 |
| JP | 2008025798 A | 2/2008 | | |
| KR | 20040048806 A * | 6/2004 | ........... | F16K 1/2265 |
| WO | WO 2012117137 A1 * | 9/2012 | ........... | F16K 1/2263 |

OTHER PUBLICATIONS

Written Opinion received in PCT/GB2014/053387, dated Feb. 13, 2015.

* cited by examiner

VALVE SEAT

The present invention relates to valve seats, and in particular, but not exclusively, to valve seats for use with valves for controlling, charging, discharging and/or regulating the flow of powders, liquids, slurries and/or fluids.

Valves are available in many designs and are used widely for regulating the flow of gases, liquids, fluidized solids, or slurries by opening, closing, or partially obstructing various passageways. Typical valve components include a valve housing which encases the valve mechanism, a moveable valve closure element for opening or closing the valve, and a valve seat, representing the inner surface of the valve assembly and being engageable with a valve closure element to open or close the valve.

There exists a number of different types of valve seats. Hard seats are integral to the valve body, often being directly machined into the metal valve body material. It is, therefore, often difficult to attain milling tolerances allowing for an accurate seal between the hard seat and the often metallic valve closure element. Accordingly, nearly all hard seated-metal valves are hampered by at least some leakage.

In contrast to hard seats, soft seats are made of softer, more flexible materials such as PTFE or various elastomers, which are themselves separately machined before being fitted to the inner surface of the valve housing as an insert. Consequently, better seat geometries can be achieved, and hence soft seated valves are typically less prone to leakage.

Notwithstanding the benefits of soft seats when compared with hard seats, there invariably exist a number of disadvantages associated with having a softer, nonintegral valve seat.

In the chemical pharmaceutical and biologics industry, valves are frequently disposed on the inlet or outlet conduits of manufacturing equipment, such as reaction vessels. The high temperatures and pressures often used to increase the rate of certain reactions can pose problems for valves having a soft seat, which may become easily deformed, thereby increasing the risk of leakage. Alternatively a soft seat may pop-out of the valve body altogether, resulting in catastrophic failure of the valve and often irreparable damage to the products being processed.

In addition to the performance-related drawbacks, soft seats are often problematic to machine, since elastomeric components are typically significantly more difficult to mill and/or grind than harder, less flexible materials. Moreover, fitting the soft seat securely and accurately within the valve body may prove difficult, and such typically comprise a foot or flange of larger diameter for locating the seat within a complementary recess on the valve body. The resulting shape of the seat means that it can only be loaded into the valve body from one direction, which presents inconveniences during valve assembly, cleaning and maintenance.

Embodiments of the invention were devised with the foregoing in mind.

According to a first aspect of the present invention, there is provided a valve seat comprising a substantially annular rigid scaffold member and a substantially annular elastomeric sealing member sealingly mounted on top of the rigid scaffold member, the valve seat having an outer peripheral surface engageable with a valve body, and an inner sealing surface formed by at least a portion of the elastomeric sealing member and engageable with a valve closure element.

The rigid scaffold member stabilises the geometry of the sealing member so that moulding tolerances are tighter than for a purely elastomeric seat. This stabilisation of geometries results in more effective contact between the valve seat and the valve closure element, thereby improving the sealing properties of the valve. The better geometries observed at the interface between the valve seat and the valve closure element improves the powder containment and pressure-withstanding capabilities of the valve, whilst minimizing the torque required to open and to dose the valve closure dement. The improved pressure-withstanding capability greatly improves containment of the material to be transferred, particularly powders. The composite seat comprising both rigid and elastomeric parts also reduces the amount of elastomeric material used and therefore significantly lowers the cost of the seat.

According to a first embodiment of the present invention, the elastomeric sealing member forms at least a portion of the outer peripheral surface of the valve seat. Product ingress between the valve seat and the valve body is therefore minimised.

According to another embodiment of the present invention, the elastomeric sealing member further comprises one or more protrusions disposed on the outer peripheral surface of the valve seat. Optionally, the one or more protrusions cooperate with complementary recesses of a valve body. Optionally, the one or more protrusions extend continuously around the outer peripheral surface of the valve seat. The use of protrusions and/or continuously extending protrusions, and their optional cooperation with recesses disposed on a valve body, minimises even further the risk of product ingress between the seat and the valve body. The effectiveness of the protrusions is greatly enhanced by the elastomeric sealing member being held firmly in place by the rigid scaffold member.

According to a further embodiment of the present invention, at least a portion of the bottom face of the valve seat is formed by the elastomeric sealing member, Accordingly, at least a portion of the elastomeric sealing member is in contact with the portion of the valve body on which the seat is mounted, thereby minimising the risk of product ingress between the bottom face of the seat and the valve body.

According to a further embodiment of the present invention, at least a portion of the outer peripheral surface of the valve seat and at least a portion of the bottom face of the valve seat is formed by the rigid scaffold member, The effectiveness of the composite valve seat comprising both rigid and elastomeric parts improves the powder containment and pressure-withstanding capabilities of the valve seat disposed in the valve body, Optionally, the portion of the bottom face of the valve seat formed by the rigid scaffold member forms a first contact surface with the valve body and the portion of the bottom face of the valve seat formed by the elastomeric sealing member forms a second contact surface with the valve body, the area of the first contact surface being greater than area of the second contact surface. Optionally, the portion of the outer peripheral surface of the valve seat formed by the rigid scaffold member forms a third contact surface with the valve body and the portion of the outer peripheral surface of the valve seat formed by the elastomeric sealing member forms a fourth contact surface with the valve body, the area of the third contact surface being greater than area of the fourth contact surface. Having a larger contact surface interface formed by the rigid scaffold member against the valve body prevents undue deformation of the valve seat.

According to yet another embodiment of the present invention the portion of the bottom face of the valve seat formed by the elastomeric sealing member further comprises one or more ridges. Optionally, the one or more ridges cooperate with complementary recesses of a valve body. Optionally, the one or more ridges extend continuously around the bottom face of the valve seat. The use of ridges and/or continuously extending ridges, and their optional co-operation with recesses disposed on a valve body minimizes even further the risk of product ingress between the bottom face of the seat and the valve body.

According to a further embodiment of the present invention, the edge defined by the outer peripheral surface of the valve seat and the bottom face of the valve seat is chamfered. The chamfered edge allows the seat to be easily inserted into the valve assembly, and the lack of a foot or flange of increased diameter allows the seat to be inserted from either side of the valve body.

According to still a further embodiment of the present invention the elastomeric sealing member is manufactured principally from ethylene propylene diene monomer rubber, fluoroelastomer or perfluoroelastomer. Such materials demonstrate high operating temperatures, and are therefore less likely to deform during use.

According to another embodiment of the present invention, the rigid scaffold member is manufactured principally from a plastic material. Plastic materials are particularly inexpensive and lightweight.

According to yet a further embodiment of the present invention, the elastomeric sealing member is sealingly mounted on top of a rigid scaffold member by a waterproof adhesive. Waterproof adhesives provide a secure and watertight bond between the rigid scaffold member and the elastomeric sealing member, thereby reducing the risk of leakage and valve failure.

According to a second aspect of the present invention, there is provided a valve assembly comprising the valve seat of the present invention, The valve seat of the present invention is likely to confer performance advantages to any valve type wherein a standard soft seat is used.

Optionally, the valve is a butterfly valve. Split valves such as butterfly valves are typically used for the containment of harmful substances, wherein reduced or zero leakage is of increased importance.

According to a third aspect of the present invention, there is provided a valve seat comprising a substantially annular rigid scaffold member and a substantially annular elastomeric sealing member sealingly mounted on top of the rigid scaffold member, the valve seat having an outer peripheral surface engageable with a valve body, and an inner sealing surface formed by at least a portion of the elastomeric sealing member and engageable with a valve closure element, wherein the valve seat comprises one or more valve seat aligning features for correctly aligning the valve seat within a valve housing. The rigid scaffold member stabilizes the geometry of the elastomeric member so that moulding tolerances are tighter than for a purely elastomeric seat. The stabilization of geometries results in more effective contact between the valve seat and the valve closure element, thereby improving the sealing properties of the valve. The better geometries observed at the interface between the valve seat and the valve closure element improve the powder containment and pressure-withstanding capabilities of the valve, whilst minimizing the torque required to open and close the valve closure element. The composite seat comprising both rigid and elastomeric parts also reduces the amount of elastomeric material used and therefore significantly lowers the cost of the seat. The use of one or more valve seat aligning features allows the valve seat to be correctly located on the valve body, thereby minimizing the risk of leakage and valve failure.

According to an embodiment of the present invention, the one or more valve seat aligning features are engageable with one or more other components of a valve assembly for correctly aligning the valve seat within a valve housing. Preferably, the one or more valve seat aligning features are engageable with the shaft or spindles of a valve closure element. The valve seat is therefore self-aligning by virtue of its cooperation with other elements of the valve assembly, such as the shaft or spindles of a valve closure element.

Optionally, the one or more valve seat aligning features comprise one or more cutaways. The one or more cutaways acts as a bearing surface for cooperation with one or more other components of a valve assembly, such as the shaft or spindles of a valve closure element, to correctly align the valve seat within the valve body.

According to another embodiment of the present invention, the one or more valve seat aligning features exposes at least a portion of the rigid scaffold member. The exposed portion of the rigid scaffold member provides a more effective bearing surface to self-align the valve seat by cooperation with one or more other components of a valve assembly.

Optionally, the one or more valve seat aligning features are disposed on a top face of the valve seat. In this orientation, the valve seat aligning features are in an ideal location to cooperate with one or more other components of the valve assembly such as the shaft or spindles of a valve closure element.

According to still another embodiment of the present invention, the number of seat aligning features is two. Optionally, the two valve seat aligning features are diametrically opposed to one another. In this orientation, the valve seat aligning features are ideally located to cooperate with one or more other components of a valve assembly, such as the shaft or spindles of a valve closure element.

According to another embodiment of the present invention, the elastomeric sealing member further comprises one or more protrusions disposed on the outer peripheral surface of the valve seat. Optionally, the one or more protrusions cooperate with complementary recesses of a valve body. Optionally, the one or more protrusions extend continuously around the outer peripheral surface of the valve seat. The use of protrusions and/or continuously extending protrusions, and their optional cooperation with recesses disposed on a valve body, minimises even further the risk of product ingress between the seat and the valve body. Alternatively, the protrusions may be disposed on the valve body and corresponding recesses disposed on the valve seat. The effectiveness of the protrusions is greatly enhanced by the elastomeric sealing member being held firmly in place by the rigid scaffold member.

According to a further embodiment of the present invention, at least a portion of the bottom face of the valve seat is formed by the elastomeric sealing member. Accordingly, at least a portion of the elastomeric sealing member is in contact with the portion of the valve body on which the seat is mounted, thereby minimising the risk of product ingress between the bottom face of the seat and the valve body. According to yet another embodiment of the present invention, the portion of the bottom face of the valve seat formed by the elastomeric sealing member further comprises one or more ridges. Optionally, the one or more ridges cooperate with complementary recesses of a valve body. Optionally, the one or more ridges extend continuously around the bottom face of the valve seat. The use of ridges and/or continuously extending ridges, and their optional corporation with recesses disposed on the valve body minimizes even further the risk of product ingress between the bottom face of the seat and the valve body.

According to a further embodiment of the present invention, the edge defined by the outer peripheral surface of the valve seat and the bottom face of the valve seat is chamfered. The chamfered edge allows the seat to be easily inserted into the valve assembly, and the lack of a foot or flange of increased diameter allows the seat to be inserted from either side of the valve body.

According to still a further embodiment of the present invention the elastomeric sealing member is manufactured principally from ethylene propylene digins monomer rubber, fluoroelastomer or perfluoroelastomer. Such materials demonstrate high operating temperatures, and are therefore less likely to deform during use.

According to another embodiment of the present invention, the rigid scaffold member is manufactured principally from a plastic material. Plastic materials are particularly inexpensive and lightweight.

According to yet a further embodiment of the present invention, the elastomeric sealing member is sealingly mounted on top of a rigid scaffold member by an adhesive. Adhesives provide a secure and watertight bond between the rigid scaffold member and the elastomeric sealing member, thereby reducing the risk of leakage and valve failure.

According to a fourth aspect of the present invention, there is provided a valve assembly comprising the valve seat of the present invention. The valve seat of the present invention is likely to confer performance advantages to any valve type wherein a standard soft seat is used.

According to another embodiment of the invention, the valve is a butterfly valve. Optionally, the butterfly valve comprises a valve closure member having one or more spindles engagable on one or more valve seat aligning features. Optionally, the number of spindles is two. The spindles of the butterfly valve cooperates with the valve seat aligning features to correctly position the seat within the valve body, thereby reducing the risk of leakage and valve failure.

One or more embodiments of the present invention will now be described by way of example only, with reference to the accompanying figures, in which.

Figure 1:
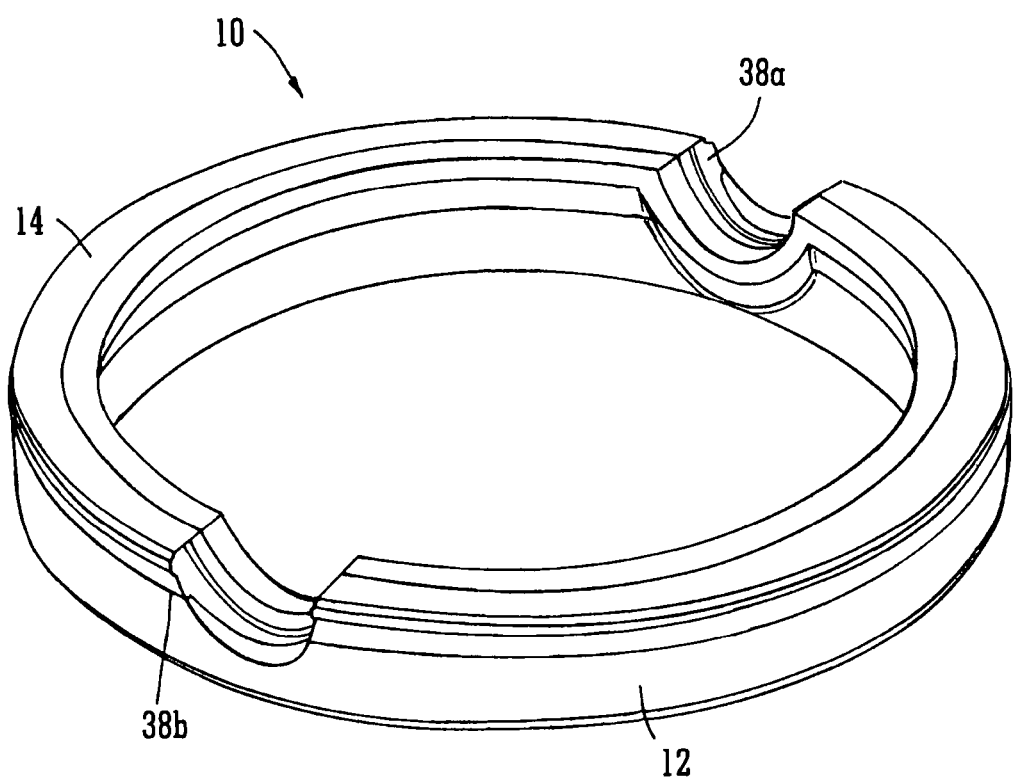
FIG. 1 is a view from one side and above of the valve seat of the present invention.

According to an embodiment of the present invention, and referring to FIG. 1, the valve seat 10 comprises a substantially annular rigid scaffold member 12 and a substantially annular elastomeric sealing member 14 sealingly mounted on top of the rigid scaffold member 12 The valve seat 10 has an outer peripheral surface for cooperation with the valve body 46 of a valve assembly 44, and the elastomeric sealing member 14 defines an inner sealing surface of the valve seat 10 for cooperation with a valve closure disc 42 of a valve assembly 44.

Figure 2:
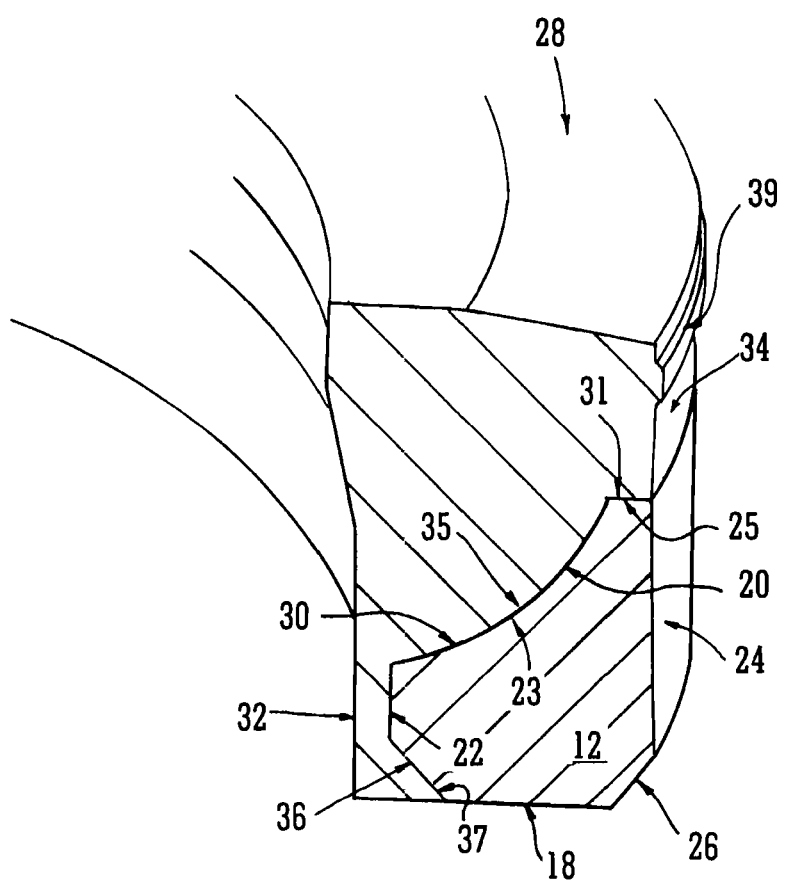
FIG. 2 is a view from one side and above of a cross-section of the valve seat of FIG. 1.

Referring to FIGS. 1 and 2, the rigid scaffold member 12 is substantially annular in form, having a bottom face 18, a top face 20, an inner circumferential face 22 and an outer circumferential face 24 defining a portion of the outer peripheral surface of the valve seat 10. The outer circumferential face 24 is taller than the inner circumferential face 22, meaning that the top face 20 is sloping. The top face 20 has a concaved portion 23, and a lip 25 lying substantially parallel to the bottom face 18. The edge 26 defined by the outer circumferential face 24 and the bottom face 18 is chamfered to facilitate insertion of the valve seat 10 into a valve body 46.

Still referring to FIGS. 1 and 2, the elastomeric sealing member 14 is also substantially annular in form and is sized and shaped so as to be mountable on top of the rigid scaffold member 12 such that the resulting valve seat 10 is also substantially annular. The elastomeric sealing member 14 has a top face 26, a bottom face 30, an inner circumferential face 32 defining an inner sealing surface of the valve seat 10, and an outer circumferential face 34, defining a portion of the outer peripheral surface of the valve seat 10. The bottom face 30 also has a flanged portion 31 for cooperation with the lip 25 of the rigid scaffold member 12. The inner circumferential face 32 is taller than the outer circumferential face 34, such that the bottom face 30 is sloping. The bottom face 30 has a convexed portion 35 for cooperation with the concaved portion 23 of the rigid scaffold member 12, and a stepped portion 36 for cooperation with a chamfered edge 37 formed between the inner circumferential face 22 and the bottom face 18 of the rigid scaffold member 12.

In an alternative embodiment the outer circumferential face 34 of the elastomeric sealing member 14 has a protruding corrugation 39 extending continuously around the outer circumferential face 34 for cooperation with a complementary furrow extending continuously around an inner surface of a valve body 46.

Figure 3:
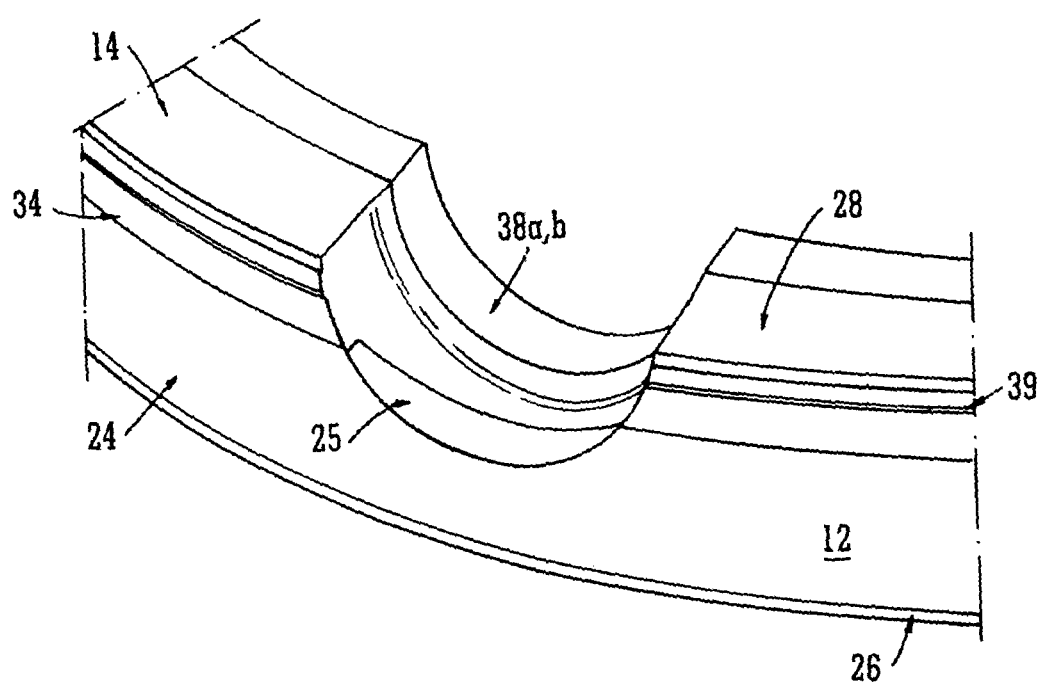
FIG. 3 is a view from one side and above of a valve seat aligning feature of the valve seat of FIG. 1.
Figure 4:
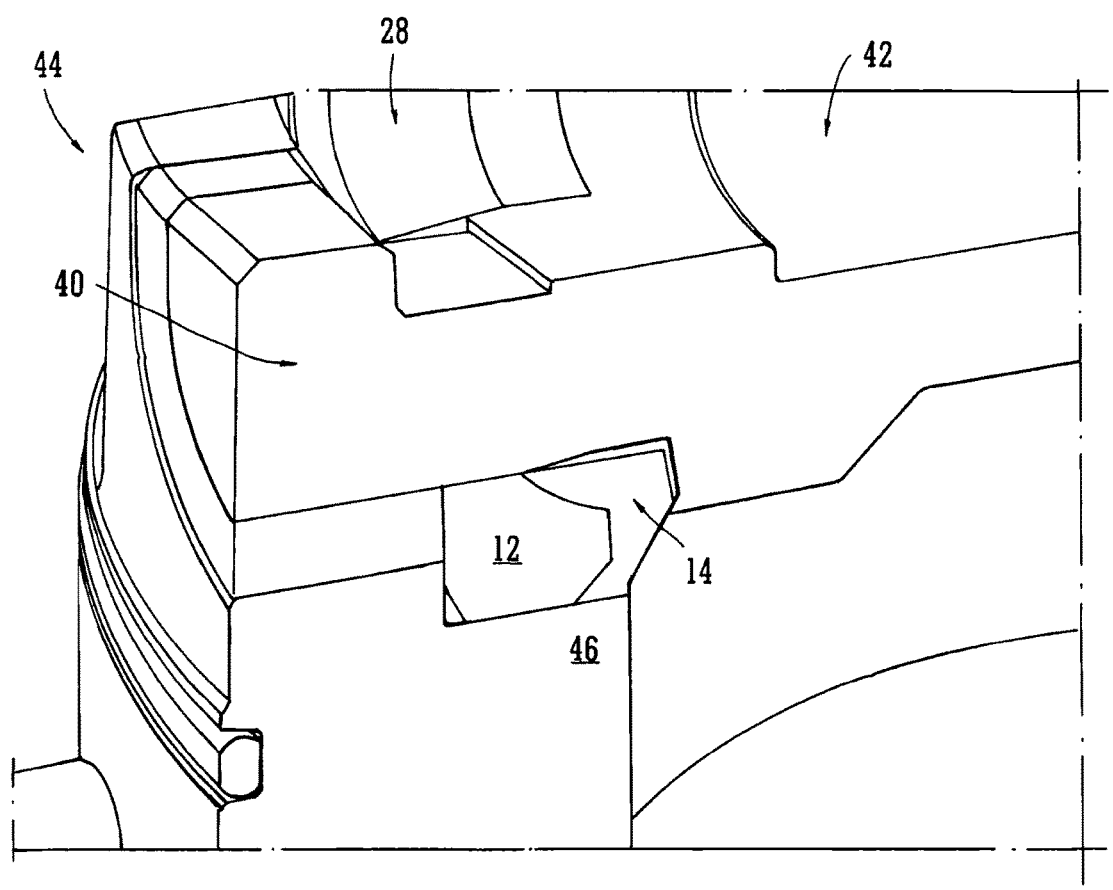
FIG. 4 is a view from one side and above of a cross-section of the valve seat of FIG. 1 seated within a valve assembly.

Referring now to FIGS. 1, 3 and 4, the top face 28 of the substantially annular elastomeric sealing member 14 includes two cutaway portions 38a, 38b representing concaved incursions, being diametrically opposed to one another, The cutaways 38a, 38b are shaped to be engageable with the spindles 40 of a valve closure disc 42 in a valve assembly 44.

Referring to FIGS. 1, 2 and 3, the valve seat 10 is assembled by mounting the substantially annular elastomeric sealing member 14 on top of the rigid scaffold member 12. The bottom face 30 of the elastomeric sealing member 14, including the convexed portion 35, flanged portion 31 and stepped portion 36, are sealingly adhered to the concaved portion 23, lip 25, inner circumferential face 22 and recess of the top face 20 of the rigid scaffold member 12. At least a portion of the bottom face of the assembled valve seat 10 is therefore formed by the elastomeric sealing member 14. In the assembled valve seat 10, the cutaways 38a, 38b expose a portion of the lip 25 of the top face 20 of the rigid scaffold member 12.

The valve seat 10 is assembled by mounting the substantially annular elastomeric sealing member 14 on top of the rigid scaffold member 12. As can be clearly seen from FIGS. 1, 2 and 3, the annular rigid scaffold member 12 is defined by a bottom face 18, a top face 20, an inner circumferential face 22 and an outer circumferential face 24 which defines a portion of the outer peripheral surface of the valve seat 10. At least a portion of the outer peripheral surface of the valve seat 10 and at least a portion of the bottom face 18 of the valve seat 10 is formed by the rigid scaffold member 12. Exposing at least two faces of the rigid scaffold member 12, in this embodiment, the bottom face 18 and the outer circumferential face 24 of the rigid scaffold member 12 provides the necessary structural integrity for supporting the elastomeric sealing member 14.

As best illustrated in FIG. 3, the portion of the bottom face 18 of the valve seat 10 that is formed by the rigid scaffold member 12 defines a first circumferential contact surface with the valve body 46, and the portion of the bottom face 18 of the valve seat 10 that is formed by the elastomeric sealing member 14 defines a second circumferential contact surface with the valve body 46. The area of the first circumferential contact surface is greater than area of the second circumferential contact surface. Likewise, the portion of the outer peripheral surface of the valve seat 10 formed by the rigid scaffold member 12 forms a third circumferential contact surface with the valve body 46, and the portion of the outer peripheral surface of the valve seat 10 formed by the elastomeric sealing member 12 defines a fourth circumferential contact surface with the valve body 46. The area of the third circumferential contact surface being greater than area of the fourth circumferential contact surface. Having a larger contact surface formed by the rigid scaffold member 12 against the valve body 46 prevents unwanted deformation of the valve seat 10 in use.

Figure 5:
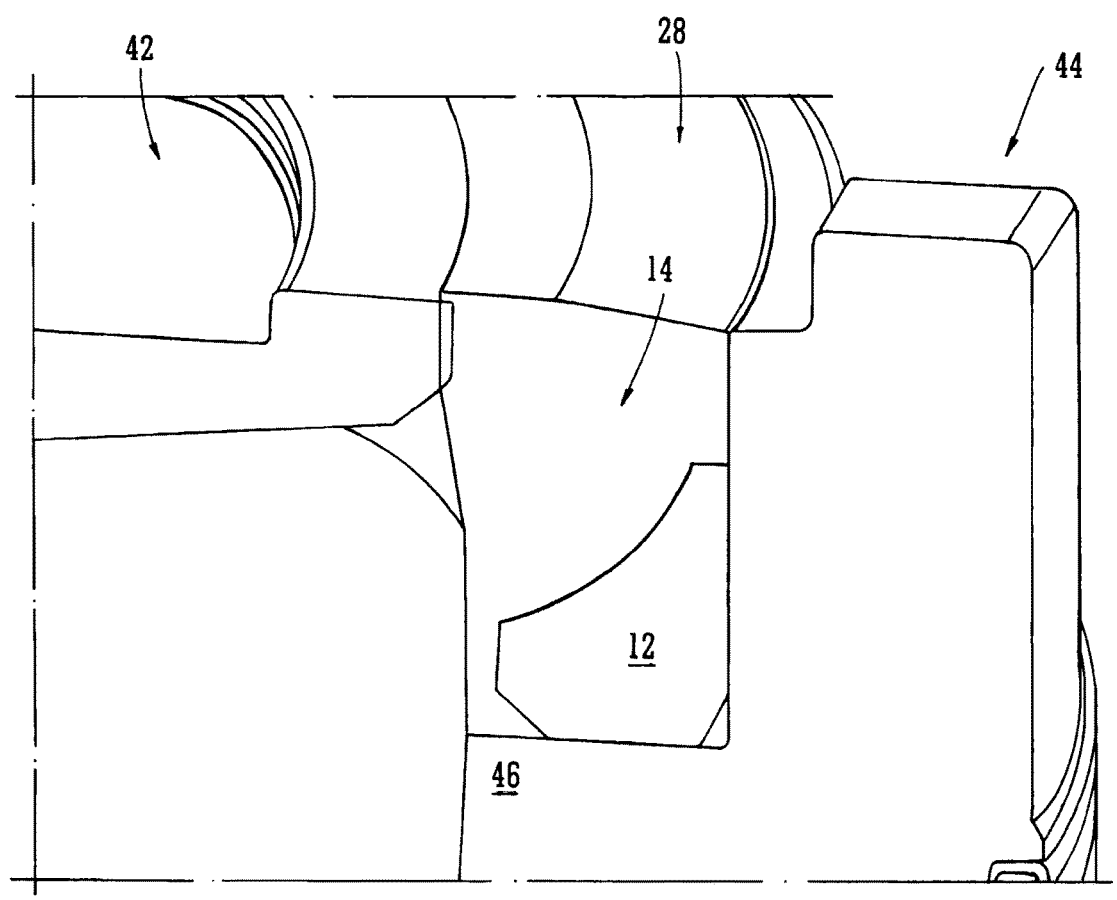
FIG. 5 is a view from one side and above of a cross-section of the valve seat of FIG. 1 seated within a valve assembly.

Referring now to FIGS. 4 and 5, the assembled valve seat 10 is inserted into a valve seat 46 of a valve assembly 44. Chamfered edge 26 facilitates this process. In use, the spindles 40 of a valve closure disc 42 engage with the cutaways 38a, 38b, with the exposed portion of the lip 25 functioning as a bearing surface for correctly aligning the valve seat 10 within the valve body 46.

The rigid scaffold member 12 and the elastomeric sealing member 14 are substantially annular in form. Preferably, the rigid scaffold member 12 and the elastomeric sealing member 14 are circular, although it will be understood by a skilled person that the rigid scaffold member 12 and the elastomeric sealing member 14 may be formed into various other shapes being understood to fall within the scope of the appended claims, including, but not limited to, an ellipse, a quadrilateral, or any regular or irregular-sided polygon depending on the variety of the valve being used.

The rigid scaffold member 12 is preferably made from a hard, lightweight material having a high operating temperature and/or pressure. Preferably the rigid scaffold member 12 is formed from a plastic material, although it will be understood by a skilled person that other materials are envisaged as falling within the scope of the appended claims, such as stainless steel, nickel alloys, lightweight metals, carbon fibres or combinations or mixtures thereof. The elastomeric sealing member 14 is preferably made from an elastomeric, lightweight material, having a high operating temperature and/or pressure. Preferably, the elastomeric sealing member 14 is formed from an ethylene propylene diene monomer material, a perfluoroelastomer or a fluoroelastomer material, or a combination or mixture thereof. It will, however, be understood by a skilled person that the elastomeric sealing member 14 may be formed from other materials being understood to fall within the scope of the appended claims, such as natural polyisoprene, natural rubber, isoprene, butadiene, chloroprene, polychloroprene, neoprene, butyl rubber, halogenated butyl rubber, styrene-butadiene rubber, nitrile rubber, epichlorohydrin rubber, polyacrylic rubber, silicone rubber, fluorosilicone rubber, polyether block amide, chlorosulfonated polyethylene, ethylene-vinyl acetate, or combinations or mixtures thereof.

Preferably, the elastomeric sealing member 14 is sealingly mounted on top of the rigid scaffold member 12 using an adhesive safe for use with consumable products (which is regulatory approved or compliant), although it will be understood by a skilled person that other means of attaching are envisaged as falling within the scope of the appended claims, providing that they provide a secure and watertight bond. Preferably, the contacting surfaces of the rigid scaffold member 12 and the elastomeric sealing member 14 are sand-blasted prior to adhering, although other means of improving the effectiveness of the adhesive bond are also envisaged as falling within the scope of the appended claims, including, but not limited, other surface-roughening techniques.

Figure 6:
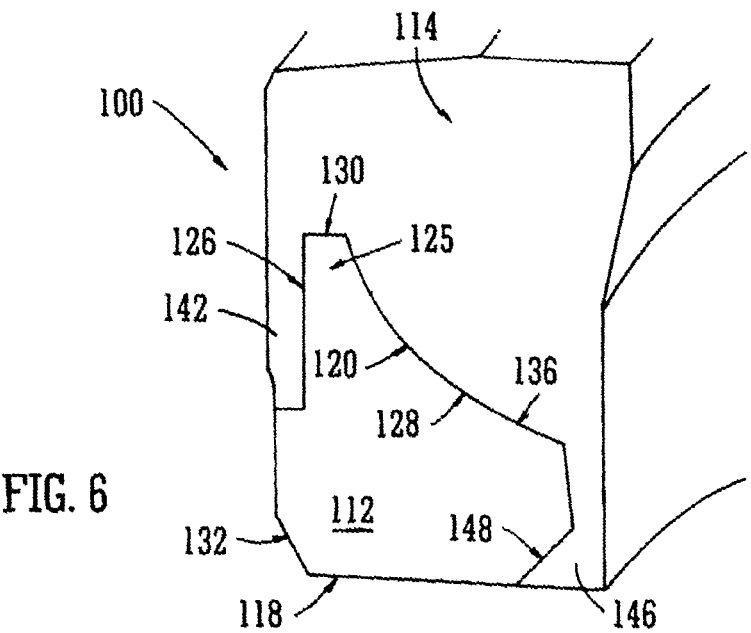
FIG. 6 is a partial sectional view of a valve seat in accordance with the present invention.

In an alternative embodiment (FIGS. 6 and 7), a valve seat 100 comprises a substantially annular rigid scaffold member 112 and a substantially annular elastomeric sealing member 114 sealingly mounted on top of the rigid scaffold member 112. The valve seat 100 has an outer peripheral surface for cooperation with the valve body of a valve assembly, and the elastomeric sealing member 114 defines an inner sealing surface of the valve seat 100 for cooperation with a valve closure disc of a valve assembly.

The rigid scaffold member 112 is substantially annular in form, having a bottom face 118, a top face 120, an inner circumferential face 122 and an outer circumferential face 124 defining a portion of the outer peripheral surface of the valve seat 100. Extending between the outer and inner circumferential faces 124, 122 is a ridge 125 having an outer face 126 that extends substantially perpendicularly to the plane of the rigid scaffold member 112, The edge 128 defined by the outer circumferential inner face 120 is concave extending from a lip 130 to the inner circumferential face 122, face 124 and the bottom face 118 is chamfered to facilitate insertion of the valve seat 100 into a valve body.

The elastomeric sealing member 114 is also substantially annular in form and is sized and shaped so as to be mountable on top of the rigid scaffold member 112 such that the resulting valve seat 100 is also substantially annular. The elastomeric sealing member 114 has a top face 134, a bottom face 136, an inner circumferential face 138 defining an inner sealing surface of the valve seat 100, and an outer circumferential face 140 defining a portion of the outer peripheral surface of the valve seat 100. The bottom face 136 also has a downwardly extending lip 142 forming a channel complimentarily shaped with respect to the ridge 125 for receiving the ridge 125. The bottom face 136 has a convexed portion for cooperation with the concaved portion of the rigid scaffold member 112, and a stepped portion 146 for cooperation with a chamfered edge 148 formed between the inner circumferential face 122 and the bottom face 118 of the rigid scaffold member 112.

The top face 134 of the substantially annular elastomeric sealing member 114 includes two cutaway portions (only one shown) 150, diametrically opposed to one another. The cutaways 150 are shaped to be engageable with the spindles of a valve closure disc in a valve assembly.

Figure 7:
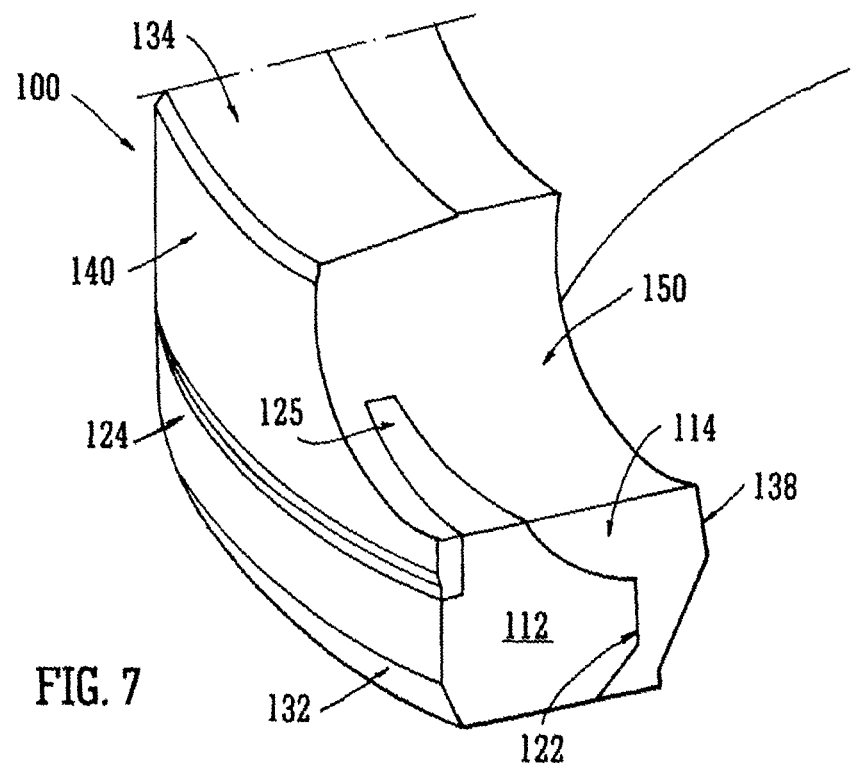
FIG. 7 is a partial sectional view of a valve seat aligning feature in accordance with the present invention.

As shown in FIG. 7, the downwardly extending lip 142 assists in creating an improved seal between the valve body and the valve seat 100 as the outer face 140 of the sealing member extends around the entire circumference of the sealing member.

Whilst specific embodiments have been described herein for the purpose of reference and illustration, various modifications will be apparent to a person skilled in the art and may be made without departing from the scope of the invention.

The invention claimed is:

1. A valve assembly comprising
   (a) a valve seat comprising
      a substantially annular rigid scaffold member and
      a substantially annular elastomeric sealing member sealingly mounted on the rigid scaffold member, the valve seat having
      an outer peripheral surface engageable with a valve body, and
      an inner sealing surface formed by at least a portion of the elastomeric sealing member and engageable with a valve closure element, wherein the valve seat comprises one or more valve seat aligning features that are engageable with a shaft or spindles of the valve closure element, and wherein the one or more valve seat aligning features expose at least a portion of the rigid scaffold member, which is a bearing surface for the shaft or spindles of the valve closure element,
      wherein at least a portion of the outer peripheral surface of the valve seat and at least a portion of a bottom face of the valve seat is formed by the rigid scaffold member, and
      wherein the portion of the bottom face of the valve seat formed by the rigid scaffold member forms a first contact surface with the valve body and the portion of the bottom face of the valve seat formed by the elastomeric sealing member forms a second contact surface with the valve body, the area of the first contact surface being greater than area of the second contact surface; and
   (b) the valve body,
   wherein the valve assembly is a split-butterfly valve assembly.

2. The valve assembly as claimed in claim 1, wherein the portion of the outer peripheral surface of the valve seat formed by the rigid scaffold member forms a third contact surface with the valve body and the portion of the outer peripheral surface of the valve seat formed by the elastomeric sealing member forms a fourth contact surface with the valve body, the area of the third contact surface being greater than area of the fourth contact surface.

3. The valve assembly as claimed in claim 1, wherein the elastomeric sealing member is manufactured principally from ethylene propylene diene monomer rubber, perfluoroelastomer, fluoroelastomer, or one or more combinations thereof.

4. The valve assembly as claimed in claim 1, wherein the rigid scaffold member is manufactured substantially from a plastic material.

5. The valve assembly as claimed in claim 1, wherein the elastomeric sealing member is sealingly mounted on the rigid scaffold member by an adhesive.

6. The valve assembly as claimed in claim 1, wherein the one or more valve seat aligning features are engageable with one or more other components of a valve assembly to correctly align the valve seat within a valve housing.

7. The valve assembly as claimed in claim 1, wherein the one or more valve seat aligning features comprise one or more cutaways.

8. The valve assembly as claimed in claim 1, wherein the one or more valve seat aligning features are disposed on a top face of the valve seat.

9. The valve assembly as claimed in claim 1, wherein the elastomeric sealing member is sealingly mounted on the rigid scaffold member by a waterproof adhesive.

10. The valve assembly as claimed in claim 1, having two valve seat aligning features.

11. The valve assembly as claimed in claim 10, wherein the two valve seat aligning features are diametrically opposed to one another.

12. The valve assembly as claimed in claim 1, wherein the split-butterfly valve comprises a valve closure member having one or more spindles engageable with the one or more valve seat aligning features.

13. The valve assembly as claimed in claim 12, wherein the one or more spindles is two spindles.

14. The valve assembly as claimed in claim 1, wherein the elastomeric sealing member further comprises one or more protrusions disposed on the outer peripheral surface of the valve seat.

15. The valve assembly as claimed in claim 14, wherein the surface of the one or more protrusions abut the surface of one or more complementary recesses of the valve body.

16. The valve assembly as claimed in claim 1, wherein the elastomeric sealing member comprises one or more recesses on the outer peripheral surface of the valve seat.

17. The valve assembly as claimed in claim 16, wherein the surface of the one or more recesses abut the surface of one or more complementary protrusions of the valve body.

18. The valve assembly as claimed in claim 1, wherein the elastomeric sealing member forms at least a portion of the outer peripheral surface of the valve seat.

19. The valve assembly as claimed in claim 18, wherein the elastomeric sealing member comprises one or more recesses on the outer peripheral surface of the valve seat.

20. The valve assembly as claimed in claim 18, wherein the elastomeric sealing member further comprises one or more protrusions disposed on the outer peripheral surface of the valve seat.

21. The valve assembly as claimed in claim 20, wherein the one or more protrusions extend continuously around the outer peripheral surface of the valve seat.

22. The valve assembly as claimed in claim 1, wherein at least a portion of a bottom face of the valve seat is formed by the elastomeric sealing member.

23. The valve assembly as claimed in claim 22, wherein the valve seat further comprises one or more ridges.

24. The valve assembly as claimed in claim 23, wherein the one or more ridges extend continuously around the bottom face of the valve seat.

25. The valve assembly as claimed in claim 24, wherein an edge defined by the outer peripheral surface of the valve seat and the bottom face of the valve seat is chamfered.

* * * * *